United States Patent
Kim et al.

(10) Patent No.: US 8,253,675 B2
(45) Date of Patent: Aug. 28, 2012

(54) DISPLAY APPARATUS INCLUDING WIRELESS COMMUNICATION DEVICE AND METHOD OF OPERATING THE SAME

(75) Inventors: Bum-jin Kim, Cheonan-si (KR); Seung-je Lee, Seongnam-si (KR); Seoung-bum Pyoun, Pyeongtaek-si (KR); Woo-il Park, Yongin-si (KR); Dae-seoo Kim, Anseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1045 days.

(21) Appl. No.: 12/183,570

(22) Filed: Jul. 31, 2008

(65) Prior Publication Data

US 2009/0066677 A1 Mar. 12, 2009

(30) Foreign Application Priority Data

Sep. 12, 2007 (KR) .......................... 10-2007-0092714

(51) Int. Cl.
- G09G 3/36 (2006.01)
- H04B 1/00 (2006.01)
- H04B 15/00 (2006.01)

(52) U.S. Cl. ......................................... 345/94; 455/63.3
(58) Field of Classification Search ............ 345/87–102, 345/204; 375/144, 346–351; 455/501, 63.1
See application file for complete search history.

(56) References Cited

U.S. PATENT DOCUMENTS

| | | | |
|---|---|---|---|
| 7,676,197 B2 * | 3/2010 | Lin et al. | 455/63.3 |
| 7,895,461 B2 * | 2/2011 | Lagnado et al. | 713/501 |
| 2003/0198307 A1 | 10/2003 | Neill et al. | |
| 2006/0166622 A1 * | 7/2006 | Usui et al. | 455/63.1 |

FOREIGN PATENT DOCUMENTS

| | | |
|---|---|---|
| JP | 2000-077980 | 3/2000 |
| JP | 2002-290340 | 10/2002 |
| JP | 2006 237718 | 9/2006 |
| JP | 2007-043246 | 2/2007 |
| JP | 2007-158633 | 6/2007 |
| KR | 1999-010293 | 2/1999 |

OTHER PUBLICATIONS

English Abstract for Publication No. JP 2006 237718.
Extended European Search Report.
English Abstract for Publication No. 1999-010293.
English Abstract for Publication No. 2000-077980.
English Abstract for Publication No. 2007-043246.
English Abstract for Publication No. 2002-290340.
English Abstract for Publication No.: 2007-158633.
Japanese Office Action Dated May 1, 2012.

* cited by examiner

*Primary Examiner* — Bipin Shalwala
*Assistant Examiner* — Steven Holton
(74) *Attorney, Agent, or Firm* — F. Chau & Associates, LLC (57) ABSTRACT

A display apparatus and a method of operating the same are provided. The display apparatus includes a wireless communication device, and a display unit that receives a main clock and is operated by an operating frequency in response to the frequency of the main clock, and a main-clock-providing unit that measures noise in signals received from a wireless communication channel, and changes the frequency of the main clock to reduce the noise.

18 Claims, 6 Drawing Sheets

DISPLAY APPARATUS INCLUDING WIRELESS COMMUNICATION DEVICE AND METHOD OF OPERATING THE SAME

CROSS-REFERENCE TO RELATED APPLICATION

This application claims priority from Korean Patent Application No. 10-2007-0092714 filed on Sep. 12, 2007 in the Korean Intellectual Property Office, the contents of which are herein incorporated by reference in their entirety.

BACKGROUND OF THE INVENTION

1. Field of the Invention

The present disclosure is directed to a display apparatus and a method of operating the same, and, more particularly, to a display apparatus including a wireless communication device and a method of operating the display apparatus.

2. Description of the Related Art

Recent advances in flat panel displays, such as liquid crystal displays (LCDs), organic light emitting diodes displays (OLEDs), or the like, have enabled miniaturizations of display apparatuses. Such miniaturized display apparatuses are currently widely used in portable electronic products.

Along with the development of wireless communication technology, display apparatuses are widely used in combination with wireless communication devices, such as Global Positioning System (GPS) devices, Digital Multimedia Broadcasting (DMB) devices, Wireless Wide Area Networks (WWANs), or Wireless Local Area Network (WLANs). Wireless communication is accomplished by transmitting and/or receiving electromagnetic signals using space as a transmission medium, and is widely employed because there is little spatial limitation. However, compared to conventional wired communication, wireless communication is prone to noise, resulting in poor reception.

In particular, reception rate may be aggravated in the wireless communication devices used in combination with a display apparatus, such as a notebook computer using a WWAN or a WLAN.

SUMMARY OF THE INVENTION

Embodiments of the present invention provide a display apparatus including a wireless communication device having an improved reception rate.

Embodiments of the present invention also provide a method of operating a display apparatus including a wireless communication device having an improved reception rate.

According to an aspect of the present invention, there is provided a display apparatus including a wireless communication device, the display apparatus including a display unit that receives a main clock and operated at an operating frequency in response to the frequency of the main clock, and a main-clock-providing unit that measures noise in signals received from a wireless communication channel, and changes the frequency of the main clock to reduce the noise.

According to another aspect of the present invention, there is provided a method of operating a display apparatus including a wireless communication device, the method including measuring noise in signals received from a wireless communication channel to supply a main clock and changing a frequency of the main clock to reduce the noise, and receiving the main clock and operating a display unit by an operating frequency in response to the frequency of the main clock.

BRIEF DESCRIPTION OF THE DRAWINGS

The above and other features of embodiments of the present invention will become apparent by describing in detail exemplary embodiments thereof with reference to the attached drawings.

DETAILED DESCRIPTION OF EXEMPLARY EMBODIMENTS

Features of embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Like reference numerals refer to like elements throughout the specification.

First, a display apparatus including a wireless communication device according to an embodiment of the present invention will be described with reference to FIGS. 1 through 4B.

Figure 1:
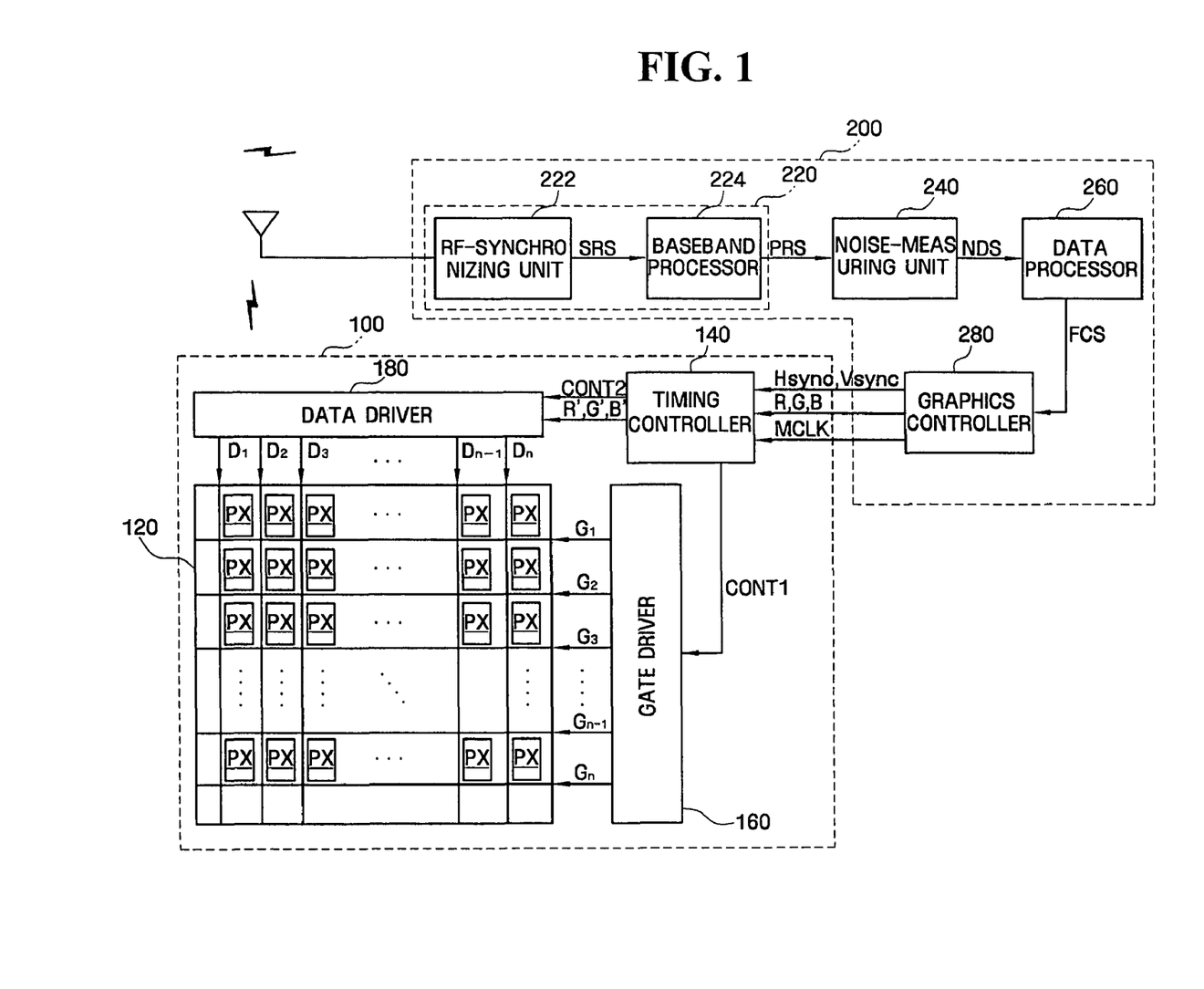
FIG. 1 is a block diagram of a display apparatus including a wireless communication device according to an embodiment of the present invention.
Figure 2:
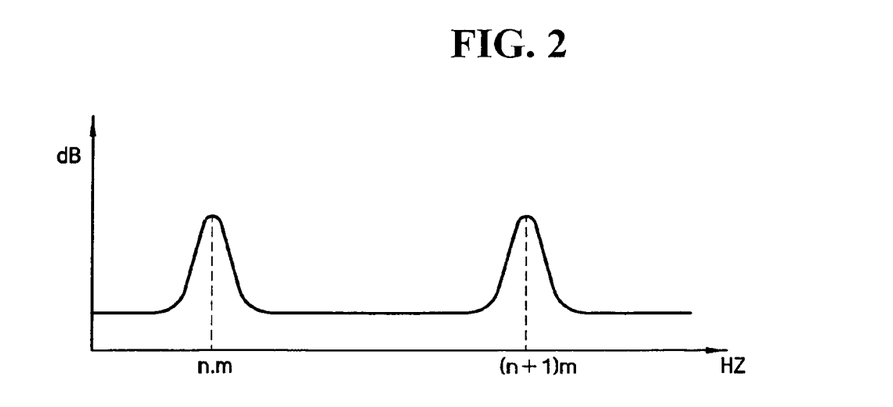
FIG. 2 illustrates noise generated when driving the display apparatus according to an embodiment of the present invention.
Figure 3:
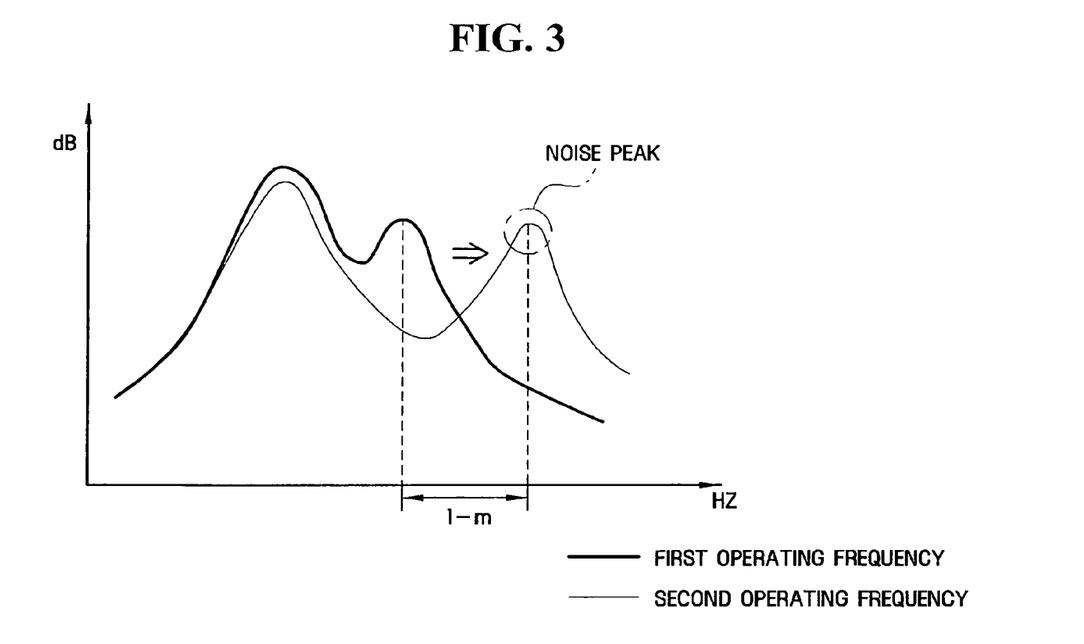
FIG. 3 is a diagram illustrating an exemplary method of measuring noise using the noise-measuring unit shown in FIG. 1.
Figure 4A:
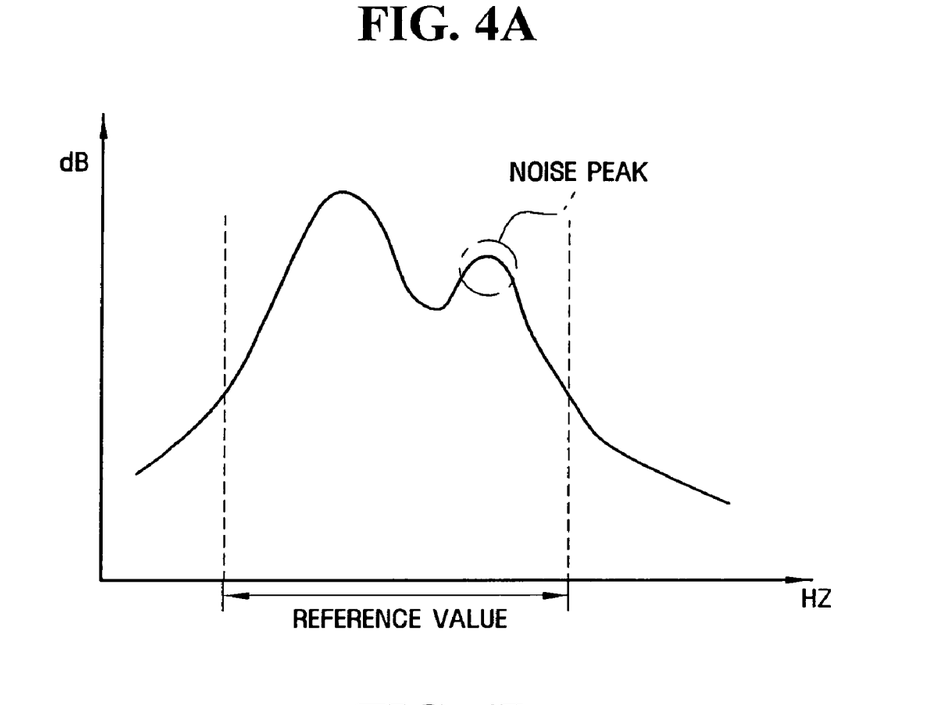
FIGS. 4A and 4B are diagrams illustrating an exemplary method of determining noise allowance using the data-processing unit shown in FIG. 1.
Figure 4B:
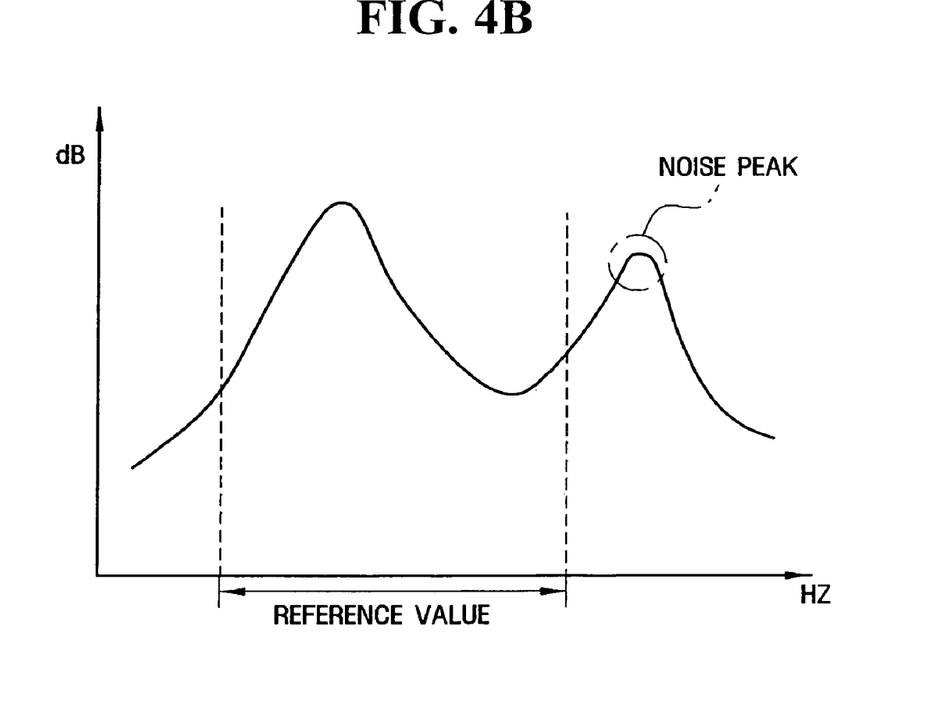

FIG. 1 is a block diagram of a display apparatus including a wireless communication device according to an embodiment of the present invention, FIG. 2 illustrates noise generated when driving the display apparatus according to an embodiment of the present invention, FIG. 3 is a diagram illustrating an exemplary method of measuring noise using a noise-measuring unit shown in FIG. 1, and FIGS. 4A and 4B are diagrams illustrating an exemplary method of determining noise allowance using the data-processing unit shown in FIG. 1.

Referring to FIG. 1, a display apparatus including a wireless communication device according to an embodiment of the present invention includes a display unit 100 and a main-clock-providing unit 200.

The display unit 100 receives input image signals R, G, B and input control signals Vsync, Hsync, MCLK from a graphics controller 280, and displays information. The display unit 100 includes a display panel 120, a timing controller 140, a gate driver 160, and a data driver 180.

The display panel 120 includes a plurality of unit pixels PX connected to a plurality of display signal lines G1-Gn and D1-Dm and arranged substantially in a matrix. The display signal lines G1-Gn and D1-Dn include a plurality of gate lines G1-Gn transmitting gate signals and a plurality of data lines D1-Dn transmitting data signals. Here, the display panel 120 may be an LCD (Liquid Display) panel, an OLED (Organic Light Emitting Diode) display panel, or a PDP (Plasma Display Panel) according to the implementation method of unit pixel PX.

The timing controller 140 is supplied by an external graphics controller (not shown) with input image red, green, and blue signals R, G and B and input control signals Hsync, Vsync, MCLK controlling the display of the LCD, for example, a vertical synchronization signal $V_{sync}$, a horizontal synchronization signal $H_{sync}$, a main clock MCLK, etc. The timing controller 140 generates gate control signals CONT1, data control signals CONT2, and processed image signals R', G', B' the basis of the input control signals. The timing controller 140 provides the gate control signals CONT1 to the gate driver 160, the data control signals CONT2 and the processed image signals R', G' and B' to the data driver 180.

Here, signals supplied from the timing controller 140, such as the gate control signals CONT1, or the data control signals CONT2, can be temporally controlled on the basis of the main clock MCLK. Frequencies of the main clock MCLK may be operating frequencies of the display unit 100. Here, the operating frequencies may be defined by a frame rate, total horizontal data, or vertical data in total. The total horizontal data may include H-sync, H-backporch, and H-active, and the vertical data in total may include V-sync, V-backporch, and V-active.

In addition, the gate control signals CONT1 for controlling the operation of the data driver 180, include a vertical synchronization start signal STV for indicating the start of a gate-on voltage Von, a gate clock signal for controlling the output time of the gate-on voltage Von, and so on.

The data control signals CONT2 for controlling the operation of the data driver 180 include a horizontal synchronization start signal STH for indicating the start of the operation of the data driver 180, and a data clock signal for determining an output timing of the image signals R', G', B'.

The gate driver 160 is connected to the gate lines G1-Gn, receives a gate-on voltage Von and a gate-off voltage Voff from a gate on/off voltage generator (not shown) in response to the gate control signals CONT1, and applies the same to the gate lines G1-Gn.

The data driver 180 is connected to the data lines DI-Dn and applies the image signals R', G', B' to the data lines D1-Dn in response to the data control signals CONT2.

The noise-measuring unit 240 of the main-clock-providing unit 200 calculates noise from signals PRS received from the wireless communication unit 220 and provides the calculated noise to a data provider 260. Here, the noise may be the noise generated from an operating frequency.

The noise generated from the operating frequency of the display unit, which may exert an effect on wireless communication will now be described with reference to FIG. 2.

Intense EMI (ElectroMagnetic Interference) peaks are generated around the frequency band of, for example, nm and (n+1)m, at which the frequency of the interference becomes an integer multiple of an operating frequency (m) of a display unit. That is, when EMI generated from the operating frequency of the display unit exists within the frequency band of a wireless communication channel, the EMI may cause noise to the wireless communication channel, resulting in a reduction of the reception ratio during wireless communication.

The main-clock-providing unit 200 measures noise in signals received from the wireless communication channel, changes the frequency of the main clock MCLK to reduce the noise, and provides the changed noise to the display unit 100.

The main-clock-providing unit 200 includes a wireless communication unit 220, a noise-measuring unit 240, a data processor 260, and a graphics controller 280.

The wireless communication unit 220 receives an information signal with a carrier from a receiver side through the wireless communication channel. The wireless communication unit 220 includes an RF (Radio Frequency) synchronizing unit 222 and a baseband processor 224.

The RF-synchronizing unit 222 selects a wireless communication channel and synchronizes the signals. In addition, the RF-synchronizing unit 222 provides a synchronized signal SRS to the baseband processor 224. To perform synchronous demodulation of signals received from the wireless communication channel, the RF-synchronizing unit 222 maintains an input carrier phase and a phase of a local oscillator (LOC) in a constant temporal relationship within an allowable range, synchronizing both phases.

The baseband processor 224 demodulates the synchronized signal SRS output from the RF-synchronizing unit 222 into a digital signal PRS. Baseband processor 224 separates the signal PRS output from the RF-synchronizing unit 222 into an I-channel signal and a Q-channel signal, filters the I-channel and Q-channel signals using a lowpass filter, and converts the same into a digital signal PRS using an analog-to-digital converter.

Referring to FIG. 3, the noise-measuring unit 240 measures noise NDS by analyzing a signal PRS1 received at a first operating frequency (e.g., m) and a signal PRS2 received at a second operating frequency (e.g., 1).

In more detail, when the received signals (PRS in FIG. 1) are analyzed in a frequency domain, peaks corresponding to various signals, including information signals, noise generated from the operating frequency of the display unit 100, and so on, are displayed in FIG. 3. As described above, peaks corresponding to the noise generated by the operating frequency of the display unit 100 are shown around frequencies corresponding to integer multiples of the operating frequency of the display unit 100. If the operating frequency of the display unit 100 changes, positions of the peaks shift accordingly. FIG. 3 depicts amplitude graphs for a first operating frequency and a second operating frequency.

Of the two peaks appearing for the first operating frequency and the second operating frequency, the peak whose position is shifted is defined as a noise peak and is analyzed. That is, the peak whose position is shifted by a difference between the first operating frequency and the second operating frequency, e.g., 1–m, is defined as a noise peak and analyzed. The analysis of the noise peak is performed by analyzing the frequency domain and amplitude of the noise peak.

The noise-measuring unit 240 may be embedded in a central processing unit (CPU), and may perform the above-described functions using software.

In addition, although not shown in the drawing, the noise-measuring unit 240 may be implemented as a circuit that detects a received signal strength using a received signal strength indicator (RSSI), processes the received signal, and measures the processed signal as, e.g., a bit error rate (BER).

The data processor 260 compares the noise (NDS) measured by the noise-measuring unit 240 with a reference value, and determines whether the measured noise (NDS) is allowable. The resulting signal, a frequency change signal FCS, is supplied to the graphics controller 280, which will be described below in more detail.

Referring to FIGS. 4A and 4B, the data processor 260 determines whether the noise (NDS) measured by the noise-measuring unit 240 is allowable by comparing the noise (NDS) measured by the noise-measuring unit 240 with a reference value. Here, the reference value is a frequency band having a constant width and may be the same width as that of the wireless communication channel. The reference value may also be a frequency band having a narrower width than that of the wireless communication channel.

As shown in FIG. 4A, when the noise peak is within the width of the reference value, the data processor 260 may determine that the noise is not allowable. In contrast, as shown in FIG. 4B, when the noise peak is not within the width of the reference value, the data processor 260 may determine that the noise is allowable. Even when the noise peak is within the width of the reference value, the data processor 260 may determine that the noise is allowable.

In addition, although not shown in the drawing, if two noise peaks are present in the frequency band of the wireless communication channel, the data processor 260 may determine that the noise is allowable as long as at least one noise peak or neither peak is present in the width of the reference value. Further, even if two noise peaks are present in the frequency band of the wireless communication channel, the data processor 260 may determine that the noise is allowable as long as the noise peak has an allowable size.

As the result of determining whether the noise NDS is allowable, the data processor 260 supplies a frequency change signal FCS to the graphics controller 280. If the noise NDS is not allowable, an enabled frequency change signal FCS is supplied to the graphics controller 280. If the noise NDS is allowable, a disabled frequency change signal FCS is supplied to the graphics controller 280. The data processor 260 may be embedded into the CPU.

In addition, although not shown in the drawing, if the noise is measured using an RSSI, it can be determined that the noise is not allowable if the noise strength is greater than the reference value, and that the noise is allowable if the noise strength is less than the reference value.

The graphics controller 280 provides the main clock MCLK to the timing controller 140 of the display unit 100 in response to the frequency change signal FCS output from the data processor 260.

In detail, the graphics controller 280 receives image signals from the CPU and other devices, and supplies input image signals R, G, B and input control signals Hsync, Vsync, MCLK to the timing controller 140 of the display unit 100. Here, the image signals supplied to the graphics controller 280 include the frequency change signal FCS. In addition, the graphics controller 280 changes the frequency of the main clock MCLK in response to the enabled frequency change signal FCS and supplies a changed frequency to the timing controller 140 of the display unit 100.

The main-clock-providing unit 200 may be enabled by a user's request. In detail, in a case where a user intends to use a wireless communication channel different from the conventional wireless communication channel, there would be a change in the frequency band of the wireless communication channel, resulting in noise due to the reasons described above in connection with FIG. 2. In this case, to reduce noise, the main-clock-providing unit 200 may be enabled. However, when the same wireless communication channel as the conventional wireless communication channel is used, the main-clock-providing unit 200 may be disabled.

The display apparatus including the wireless communication device according to an embodiment of the present invention operates by a feedback process. The feedback process comprises repeatedly performing the steps of driving the display unit 100, measuring noise by the main-clock-providing unit 200, and providing the main clock MCLK of a changed frequency to change the operating frequency of the display unit 100. Accordingly, the display apparatus including the wireless communication device according to an embodiment of the present invention can reduce interference due to noise during wireless communication.

Hereinafter, a display apparatus including a wireless communication device according to another embodiment of the present invention will be described with reference to FIGS. 2 through 5, in which like reference numerals identify identical elements shown in FIGS. 2 through 4B, and detailed descriptions of the same elements will be omitted.

Figure 5:
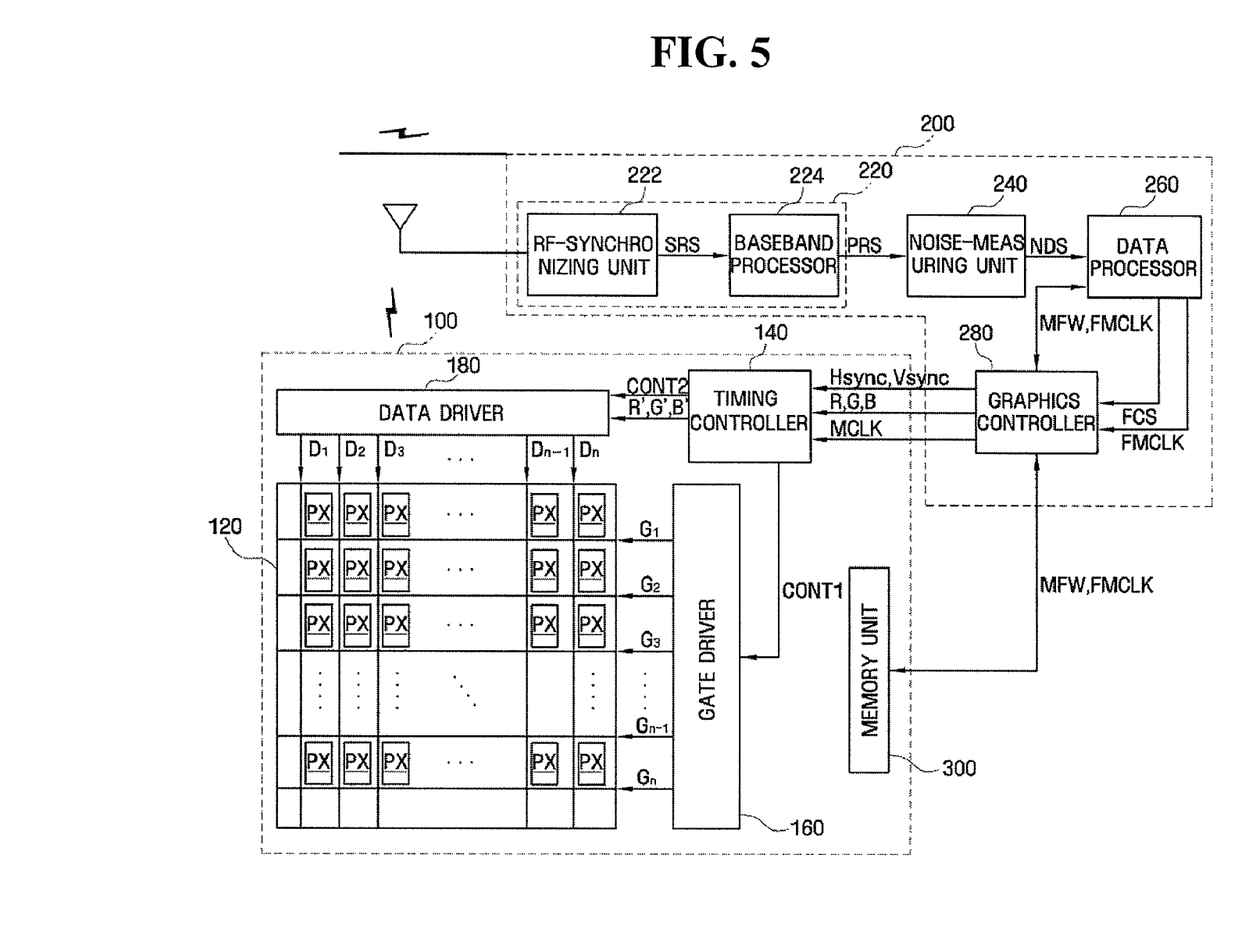
FIG. 5 is a block diagram of a display apparatus including a wireless communication device according to another embodiment of the present invention.

Referring to FIG. 5, the display apparatus including a wireless communication device according to another embodiment of the present invention differs from the display apparatus according to the embodiment of FIG. 1 in that it further includes a memory unit 300 which stores frequency band MFW of a wireless communication channel and main clock frequency FMCLK.

Another feature that distinguishes the two embodiments is that when the frequency band MFW stored in the memory unit 300 is identical with the frequency band UFW in use as a comparison result, the main clock MCLK is supplied as the stored main clock frequency FMCLK.

If the noise NDS is allowable, as determined by the data processor 260 as the comparison result of the noise NDS and the reference value, the memory unit 300 stores the frequency band MFW that is currently used by the wireless communication unit 220 and the main clock frequency FMCLK supplied to the display unit 100.

Although there is no limitation on the installation position of the memory unit 300, the memory unit 300 may be embedded in the display unit 100. In addition, the display unit 100 may have a built-in memory storing Extended Dispay Identification Data (EDID) including a manufacturer, a product identification code, basic display parameters and characteristics, and so on. In a case where the memory unit 300 is incorporated in the display unit 100, the graphics controller 280 allows the frequency band MFW of the wireless communication channel and the main clock frequency FMCLK to be stored in the memory unit 300 and the stored data MFW and FMCLK to be read from the memory unit 300.

The data processor 260 compares the frequency band MFW of the wireless communication channel, which is stored in the memory unit 300, with a frequency band UFW of the wireless communication channel that is currently in use, and if both frequencies are equal to each other, allows the graphics controller 280 to supply the main clock MCLK as the frequency FMCLK of the main clock stored in the memory unit 300. However, if the frequency band MFW of the wireless communication channel is not equal to the frequency band UFW of the wireless communication channel currently in use, noise can be further reduced through a feedback process, as described above in the embodiment of FIG. 1.

A method of operating a display apparatus including a wireless communication device according to another embodiment of the present invention will now be described with reference to FIGS. 1 through 4B and FIG. 6. The method of operating a display apparatus including a wireless communication device according to this embodiment of the present invention may be applied to the display apparatus including the wireless communication device according to the embodiment of FIG. 1.

Figure 6:
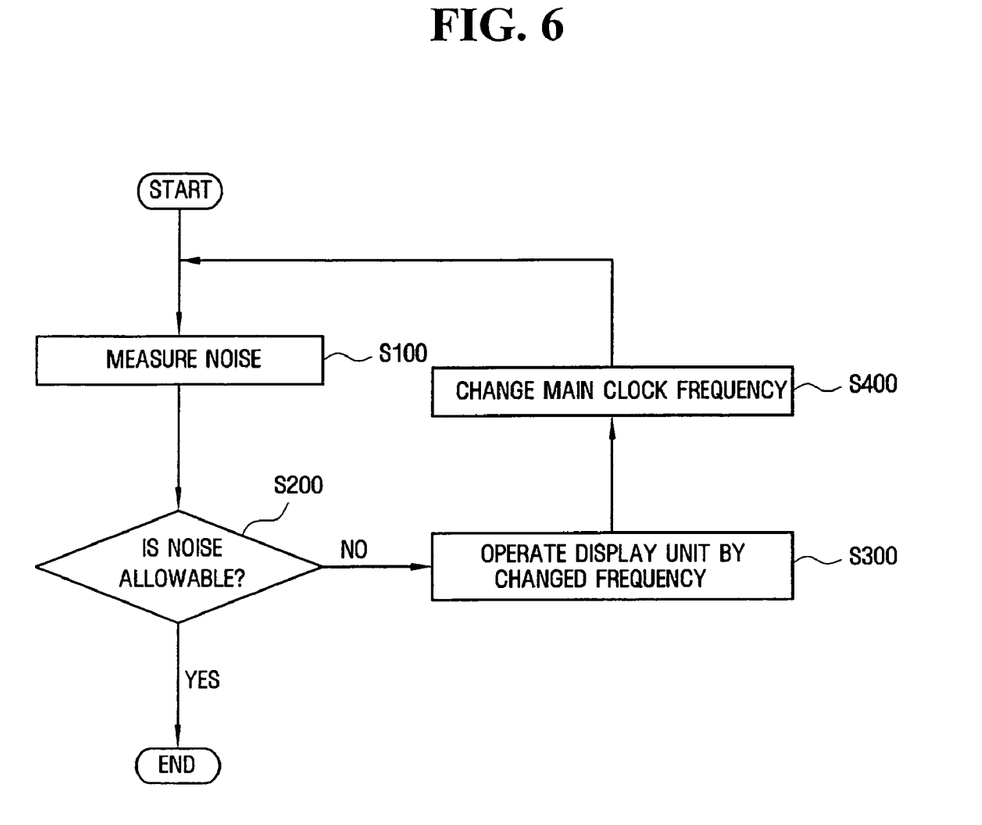
FIG. 6 is a flowchart illustrating a method of operating a display apparatus including a wireless communication device according to another embodiment of the present invention.

FIG. 6 is a flowchart illustrating a method of operating a display apparatus including a wireless communication device according to an embodiment of the present invention, in which like reference numerals identify identical elements shown in FIGS. 1 through 4B, and detailed descriptions about the identical elements will be omitted.

Referring to FIGS. 1 through 3 and FIG. 6, noise in the wireless communication channel is measured (S100). Here, the noise may be noise generated by the operating frequency of the display unit 100.

In detail, the noise NDS is measured by analyzing a signal PRS1 received at a first operating frequency (e.g., m) and a signal PRS2 received at a second operating frequency (e.g., 1).

As described above, the noise NDS generated by the operating frequency of the display unit 100 changes in peak position according to the operating frequency of the display unit 100. Accordingly, as the operating frequency of the display unit 100 varies, the peak is shifted by a variation of the operating frequency of the display unit 100 (e.g., 1−m), which is defined as a noise peak to be analyzed. The analysis of the noise peak means analysis of the frequency domain and amplitude of the noise peak, which may be performed by the CPU.

Although not shown in the drawing, the noise may be measured by detecting a received signal strength using a received signal strength indicator (RSSI), processing the received signal, and measuring the processed signal as, e.g., a bit error rate (BER).

Referring to FIGS. 1 through 4A and FIG. 6, the measured noise (NDS) is compared with a reference value to determine whether the measured noise (NDS) is allowable (S200).

In detail, the determination whether the noise (NDS) is allowable is made by comparing the position of a noise peak with a reference value. Here, the reference value is a frequency band having a constant width and may be the same width as that of the wireless communication channel. In contrast, the reference value may also be a frequency band having a narrower width than that of the wireless communication channel. When the noise peak is within the width of the reference value, it is determined that the noise is not allowable. In contrast, when the noise peak is not within the width of the reference value, it is determined that the noise is allowable. In addition, even when the noise peak is within the width of the reference value, it may be determined that the noise is allowable as long as the noise peak has an allowable size.

Further, although not shown in the drawing, if two noise peaks are present in the frequency band of the wireless communication channel, it may be determined that the noise is allowable as long as at least one noise peak or neither peak is present in the range of the reference value.

Further, although not shown in the drawing, if the noise is measured using an RSSI, it can be determined that the noise is not allowable as long as the noise strength is greater than the reference value. In contrast, it can be determined that the noise is allowable as long as the noise strength is less than the reference value.

As the determination result, if the noise is not allowable, the frequency of the main clock MCLK is changed (S300). Here, the changing of the frequency of the main clock MCLK may be performed by the data processor 260, as described above.

Then, the operating frequency of the display unit 100 is changed in response to a frequency-changed main clock MCLK and the display unit 100 is operated at the changed operating frequency (S400).

In the display apparatus including the wireless communication device according to the illustrated embodiment of the present invention, interference due to the noise generated by the operating frequency of the display unit 100 can be reduced by repeatedly performing the above-described steps.

The feedback process comprising steps S100, S200, S300, and S400 may also be enabled by user's request for the same reason as described in the embodiment of FIG. 1.

A method of operating a display apparatus including a wireless communication device according to another embodiment of the present invention will be described with reference to FIGS. 2 through 5 and FIG. 7. The method of operating the display apparatus including the wireless communication device according to this embodiment of the present invention may be applied to the display apparatus including the wireless communication device according to embodiment of FIG. 5.

Figure 7:
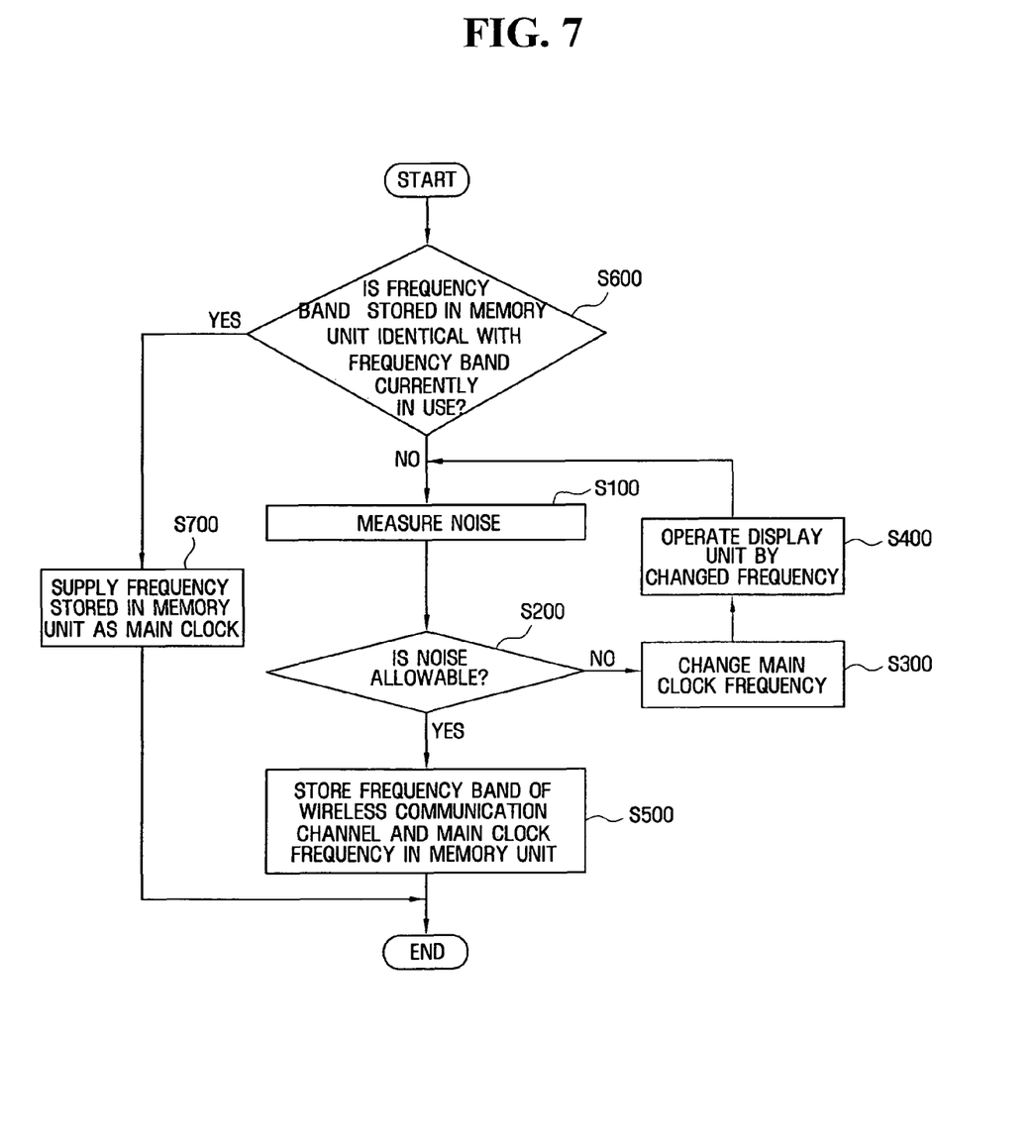
FIG. 7 is a flowchart illustrating a method of operating a display apparatus including a wireless communication device according to another embodiment of the present invention.

FIG. 7 is a flowchart illustrating a method of operating a display apparatus including a wireless communication device according to another embodiment of the present invention, in which like reference numerals identify identical elements shown in FIGS. 2 through 5, and detailed descriptions about the identical elements will be omitted.

The method of operating the display apparatus including a wireless communication device according to this embodiment of the present invention differs from the method of operating the display apparatus according to the embodiment of FIG. 6 in that it further includes, when the noise NDS is allowable, storing a frequency band MFW of a wireless communication channel and a main clock frequency FMCLK in a memory unit 300 (S500).

Another feature that distinguishes the embodiments of FIGS. 6 and 7 is that the method according to this embodiment further includes, when the frequency band MFW stored in the memory unit 300 is identical with the frequency band UFW in use as a comparison result, supplying the main clock MCLK as the stored main clock frequency FMCLK (S700).

In detail, it is determined whether the frequency band MFW stored in the memory unit 300 is identical with the frequency band UFW being in use (S600).

If the frequency band MFW is identical with the frequency band UFW, the main clock frequency FMCLK stored in the memory unit 300 is supplied to the display unit 100 (S700). In this way, the display unit 100 can be operated in the frequency band UFW or MFW of the corresponding wireless communication channel within an allowable range of the noise generated by the operating frequency of the display unit 100.

In contrast, if the frequency band MFW is not identical with the frequency band UFW, the same feedback process consisting of steps S100, S200, S300, and S400, which is the same as described in the embodiment of FIG. 6, is performed, and a detailed explanation thereof will not be given.

If it is determined in S200 that the noise NDS is allowable, the frequency band MFW being currently in use and the main clock frequency FMCLK are stored in the memory unit 300 (S500).

In detail, the frequency of the main clock MCLK supplied to the display unit 100 generates only the allowable noise in the frequency band of the communication channel currently in use through the feedback process comprising S100, S200, S300, and S400, as described in the embodiment of FIG. 6. Therefore, to avoid repetition of the above-described feedback process comprising S100, S200, S300, and S400 when communication is performed in a wireless communication channel using the same frequency band as the currently used frequency band, the current frequency band MFW and the main clock operating frequency FMCLK of the display unit 100 are stored in the memory unit 300.

As described above, in the display apparatus including a wireless communication device and the method of operating the display apparatus according to the present invention, wireless communication can be performed with an improved reception rate.

While embodiments of the present invention has been particularly shown and described with reference to exemplary embodiments thereof, it will be understood by those of ordinary skill in the art that various changes in form and details may be made therein without departing from the spirit and scope of these embodiments of present invention as defined by the following claims. It is therefore desired that the present embodiments be considered in all respects as illustrative and not restrictive, reference being made to the appended claims rather than the foregoing description to indicate the scope of the invention.

What is claimed is:

1. A display apparatus including a wireless communication device, comprising:
a display unit that receives a main clock and is operated by an operating frequency in response to the frequency of the main clock; and
a main-clock-providing unit that measures noise in signals received from a wireless communication channel, and changes the frequency of the main clock to reduce the noise,
wherein the main-clock-providing unit comprises:
a wireless communication unit that receives signals from the wireless communication channel;
a noise-measuring unit that measures noise from the received signals;
a data processor that compares the measured noise with a reference value, determines whether the measured noise is allowable, and as a determination result, supplies a frequency change signal to the graphics controller; and
a graphics controller that supplies a main clock in response to the frequency change signal,
wherein the noise-measuring unit measures noise by analyzing a signal received at a first operating frequency and a signal received at a second operating frequency, and defining as a noise peak one of two peaks appearing at the first operating frequency and the second operating frequency whose position is shifted, and analyzes the noise peak.

2. The display apparatus of claim 1, wherein the data processor supplies an enabled frequency change signal to the graphics controller, if the noise is not allowable.

3. The display apparatus of claim 1, further comprising a memory unit that stores the frequency band of the wireless communication channel and the main clock frequency, if the noise is allowable.

4. The display apparatus of claim 3, wherein the main-clock-providing unit compares the frequency band of the wireless communication channel, which is stored in the memory unit, with a frequency band of the wireless communication channel that is currently in use, and if both the frequency bands are identical, the main clock of the frequency stored in the memory unit is supplied to the display unit.

5. The display apparatus of claim 4, wherein the data processor compares the frequency band of the wireless communication channel that is stored in the memory unit, with a frequency band of the wireless communication channel that is currently in use.

6. The display apparatus of claim 1, wherein one or both of the noise-measuring unit and the data processor is embedded in a central processing unit (CPU).

7. The display apparatus of claim 1, wherein the main-clock-providing unit is enabled by a user's request.

8. A method of operating a display apparatus including a wireless communication device, comprising:
measuring noise in signals received from a wireless communication channel to supply a main clock,
comparing the noise with a reference value determining whether the noise is allowable, and changing a frequency of the main clock to reduce the noise; and
receiving the main clock and operating a display unit by an operating frequency in response to the frequency of the main clock,
wherein measuring the noise comprises measuring noise by analyzing a signal received at a first operating frequency and a signal received at a second operating frequency and defining as a noise peak one of two peaks appearing at the first operating frequency and the second operating frequency whose position is shifted, and analyzing the noise peak.

9. The method of claim 8, wherein changing the frequency of the main clock comprises:
comparing the noise with a reference value and determining whether the noise is allowable; and
changing the frequency of the main clock according to the determination result.

10. The method of claim 9, wherein the comparing of the noise comprises comparing a position of the noise peak with the reference value.

11. The method of claim 9, wherein the changing of the frequency of the main clock comprises comparing the noise with the reference value and if the noise is not allowable, changing the frequency of the main clock by a predetermined variation.

12. The method of claim 9, further comprising storing a frequency band of the wireless communication channel and the main clock frequency in a memory unit if the noise is allowable as compared with the reference value.

13. The method of claim 12, further comprising comparing the frequency band of the wireless communication channel stored in the memory unit and the frequency band of the wireless communication channel currently in use, and if both frequency bands are identical, supplying the main clock frequency stored in the memory unit to the display unit.

14. The method of claim 9, wherein one or both of measuring the noise and comparing the noise with the reference value are performed by a central processing unit (CPU).

15. The method of claim 8, wherein changing the main clock frequency is enabled by a user's request.

16. The method of claim 8, further comprising a feedback loop that includes repeating the steps of changing the operating frequency of the main clock and driving the display unit using the operating frequency derived from the changed main clock frequency.

17. A display apparatus controller device, comprising:
a wireless communication unit that receives signals from a wireless communication channel;
a noise-measuring unit that measures noise from the received signals;
a data processor that compares the measured noise with a reference value, determines whether the measured noise is allowable, and as a determination result, supplies a frequency change signal to the graphics controller; and
a graphics controller that supplies a main clock in response to the frequency change signal, wherein the frequency of the main clock is changed to reduce the noise,
wherein the noise-measuring unit measures noise by analyzing a signal received at a first operating frequency and a signal received at a second operating frequency, and defining as a noise peak one of two peaks appearing at the first operating frequency and the second operating frequency whose position is shifted, and analyzes the noise peak.

18. The device of claim 17, wherein if the noise is not allowable data processor changes the frequency of the main clock to reduce the noise.

* * * * *